United States Patent [19]

Holzhauer et al.

[11] Patent Number: 4,939,899

[45] Date of Patent: Jul. 10, 1990

[54] BIDIRECTIONAL PRESSURE SUPPLY SYSTEM IN A MOTOR VEHICLE

[75] Inventors: Horst Holzhauer, Schellbronn; Wolfgang Schneider, Calw; Günther Weikert, Weil der Stadt; Rudi Kneib, Sindelfingen; Josef Schumacher, Reutlingen, all of Fed. Rep. of Germany

[73] Assignee: Daimler-Benz AG, Fed. Rep. of Germany

[21] Appl. No.: 251,664

[22] Filed: Sep. 30, 1988

[30] Foreign Application Priority Data

Oct. 1, 1987 [DE] Fed. Rep. of Germany ....... 3733212

[51] Int. Cl.[5] ............................................. F16D 31/02

[52] U.S. Cl. ........................................ 60/412; 60/416; 60/418; 60/427; 180/289

[58] Field of Search ................. 60/413, 416, 418, 427, 60/412, 410, 411, 478; 180/316, 321, 323, 333

[56] References Cited

U.S. PATENT DOCUMENTS

| | | | |
|---|---|---|---|
| 2,243,036 | 8/1939 | Horton | 60/411 |
| 3,096,112 | 7/1963 | Johnstone | 292/3 |
| 3,163,985 | 7/1962 | Bouyoucos | 60/416 |
| 4,253,319 | 3/1981 | Feichtiger et al. | 180/289 |
| 4,270,371 | 6/1981 | Kalk | 180/289 |
| 4,412,416 | 11/1983 | Van House | 60/409 |
| 4,856,278 | 8/1989 | Widmann et al. | 60/426 |

FOREIGN PATENT DOCUMENTS

| | | |
|---|---|---|
| 2232956 | 1/1974 | Fed. Rep. of Germany . |
| 3243411 | 5/1984 | Fed. Rep. of Germany . |
| 2408056 | 11/1978 | France . |

*Primary Examiner*—Edward K. Look
*Assistant Examiner*—John E. Ryznic
*Attorney, Agent, or Firm*—Evenson, Wands, Edwards, Lenahan & McKeown

[57] ABSTRACT

A bidirectional pressure supply system for consumers of pneumatic negative pressure and/or positive pressure has a negative pressure line system and a positive pressure line system, to which the respective pressure types are simultaneously admitted from a pressure generator. Upon the electrically triggerable operation of the generator the consumers are connected, via parallel connected directional valves assigned to the consumers, to the respective pressure line system depending on the pressure type required at that moment, individually or in groups. The system provides an arrangement to apply negative pressure to first consumers and, simultaneously, positive pressure to second consumers.

20 Claims, 2 Drawing Sheets

4.2
OL
KL
5.2
10
4.1
5.1
7
1
6
4
3
2
5
8
9
20
15
14'''
14''
4
5
16
17
11
12
ZV
4.3
16'
14
18
5.3
14'
11
12
DSA
4.4
14
5.4
18
11
13
12
PTD
4.5
14
5.5

BIDIRECTIONAL PRESSURE SUPPLY SYSTEM IN A MOTOR VEHICLE

BACKGROUND AND SUMMARY OF THE INVENTION

The invention relates to a bidirectional pressure supply system for controlling various consumers of pneumatic pressure or the like in a motor vehicle, such as door locking systems, air conditioner valve controls and the like.

A bidirectional pressure supply system of the generic type is known (German Pat. Specification 3,243,411). The electrically driven air pump described in that publication has (FIG. 1 of the German patent) a positive pressure connection and a negative pressure connection. From each connection a line leads to a pneumatically reversible 4/2-way directional control valve, which connects central-locking actuator elements as a complete group to positive pressure or negative pressure, depending on its switching position.

Connected into the Positive Pressure line between pump and pneumatic directional control valve —in series with the latter —is an electromagnetically switchable 3/2-way directional control valve for alternate connection of the central-locking actuating elements or of a pure positive pressure consumer (backrest air cushion) to the positive Pressure connection of the air pump. The positive Pressure line branch has a non-return valve, a Pressure control valve and a suPPly tank as well as a pressure-monitoring switch. The latter ensures maintenance of the required Pressure level in the supply tank when the ignition is switched on, by automatic triggering of the air-pump drive motor.

The limit-stopping of the latter takes place by means of an electric switch coupled to the pneumatic drive of the 4/2-way directional control valve or by means of the separately arranged pressure-monitoring switch.

In a further exemplary embodiment of the German patent (see its FIG. 2), in the same way, the negative pressure delivery of the air pump for the supply of pure negative pressure consumers (air conditioner systems —valve control) and the central-locking actuating elements, likewise a non-return valve, an expansion tank and a (negative) pressure-monitoring switch are provided.

Furthermore, German Published Unexamined Patent Application (DOS) 2,232,956 and U.S. Pat. No. 3,096,112 already disclose pressure generators which simultaneously generate negative Pressure and positive Pressure and —according to the German DOS —admit both tYPes of Pressure simultaneously to one consumer (break booster) for Power boosting or according to the U.S. patent - admit negative pressure to two consumers and positive pressure simultaneously to two other consumers. However, all the consumers in the U.S. patent are central-locking actuating elements which are always operated simultaneously and in the same direction.

With the arrangement reflected in the above-noted prior art, it is not possible to operate consumers demanding different pressure types (negative pressure and positive pressure) simultaneously but also independently of each other by means of the pressure generator. Rather, all pressure increasing and decreasing operations have to be successively executed. This requires a relatively complex control of the pump running time and of the pressure distribution valves, which depends on the overall equipment of the vehicle and is not especially flexible with regard to equipment modifications, for example during a production series. In addition, the "successive execution" may result in long pump running times. With the customary use of reversible bidirectional pressure pumps, repeated starting-up of the pump with alternate direction of rotation and deliverY may be necessary for each case.

An object of the invention is to design a bidirectional pressure supply system of the generic type in such a way that the control of the pressure generator and the pressure distribution to a wide variety of consumers is simplified in order to increase the flexibility of the system.

This object is achieved according to the invention by providing an arrangement with bidirectional control valves arranged parallel to each other and adopted to be electromagnetically switched independently of each other for selectively switching the respective consumer individual lines individually in groups between positions connected to the respective negative and positive pressure line system and position separated from both, and electrical triggering means for initiating operation of the pressure generation and admitting the respective supply of negative and positive pressure to the respective negative and positive pressure systems, wherein each of the negative and Positive pressure line systems contain a pressure-dependently responding limit stop switch for the pressure generator and a safety valve in the form of a blow-off valve in the positive pressure line system and an intake valve in the negative pressure line system, which safety valves only open after response of the associated limit stop switch in the same line system to protect the pressure generator against overloading when not consuming the respective pressure type ($p_u$ or $p_{uml}$) if the pressure generator is in operation via the limit stop switch assigned to the other line system.

With the system of the preferred embodiments of the present invention, it consequently becomes possible, even with a large number of consumers of pneumatic pressure, growing all the time with increasing vehicle comfort requirements, to achieve a wide variety of objects with a unified bidirectional supply system. An example of simultaneous demand for positive pressure and negative pressure is the case where a motor vehicle with bidirectional pressure central locking (ZV) and pneumatic door sealing (PTD) is to be released. Positive pressure is admitted to the ZV, while the PTD requires negative pressure for detachment of the sealing hoses.

With the bidirectional pressure supply system according to the invention, the vehicle user is no longer obliged to wait for lengthy periods.

The pressure distribution can be controlled in the usual way by simple electrical triggering of the pressure generator on the one hand, whenever there is a requirement, and of a directional control valve or several control valves on the other hand, depending on the individual demand of the consumers, by means of electric switches assigned to the consumers.

Other objects, advantages and novel features of the present invention will become apparent from the following detailed description of the invention when considered in conjunction with the accompanying drawings.

DETAILED DESCRIPTION OF THE DRAWINGS

Figure 1:
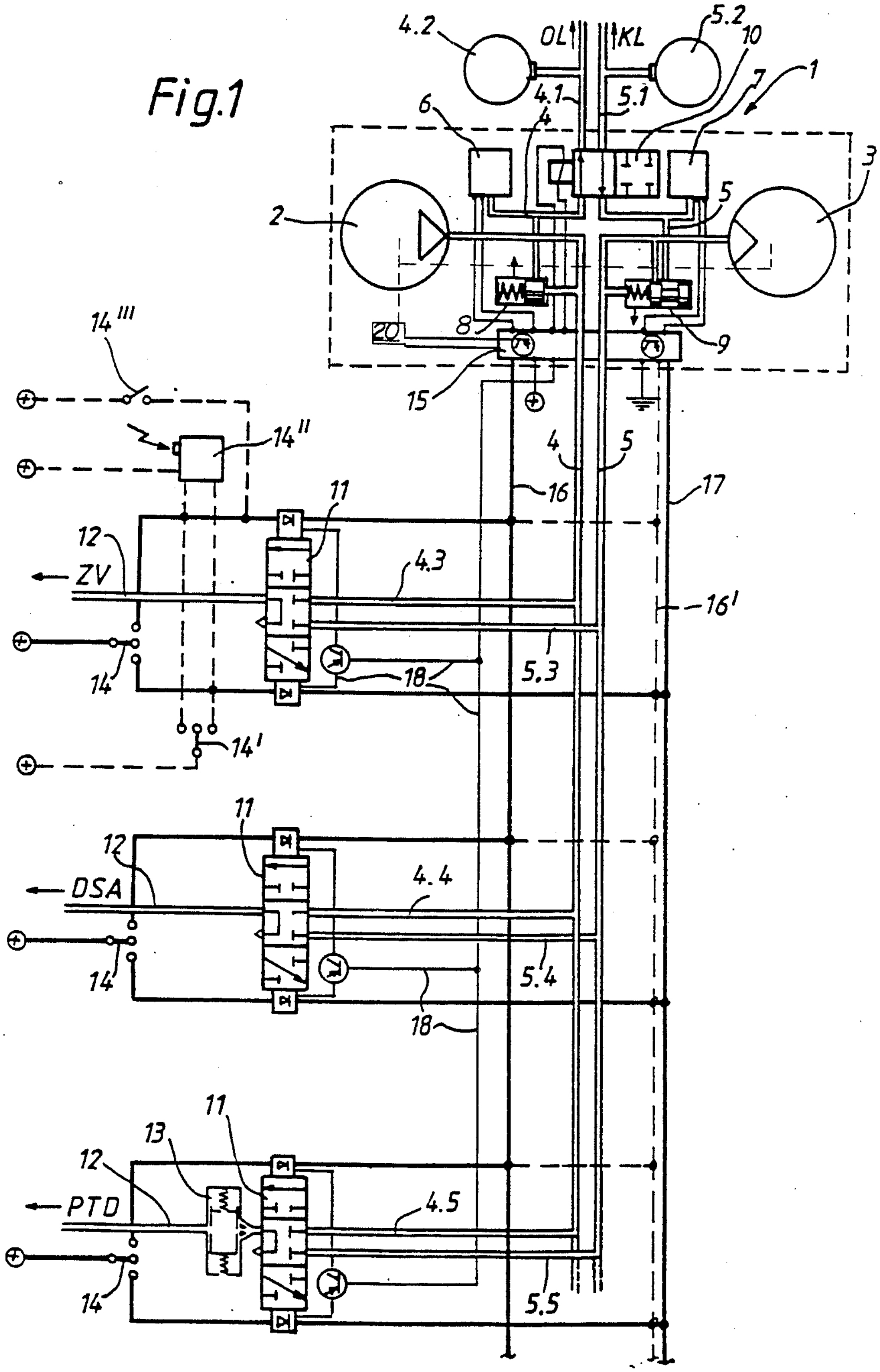
FIG. 1 is a diagrammatic representation of a bidirectional pressure supply system as electric/pneumatic circuit diagram, constructed in accordance with a preferred embodiment of the present invention.

A pressure generator 1 contains a positive pressure pump 2 and a negative pressure pump 3, which are driven jointly by an electric motor 20 (not shown). A positive pressure line system 4 is connected to the pressure connection of the positive pressure pump 2 and a negative Pressure line system 5 is connected to the suction connection of the negative pressure pump 3.

Figure 2A:
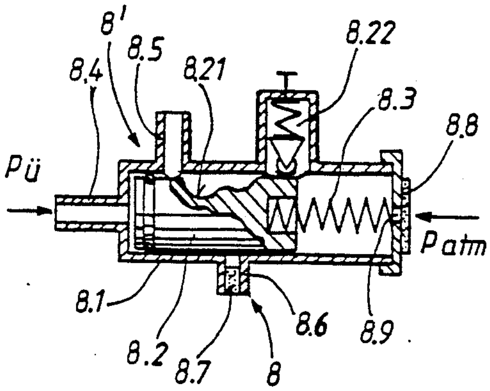
FIG. 2a shows a basic diagram of a blow-off and non-return valve of the system of FIG. 1.
Figure 2B:
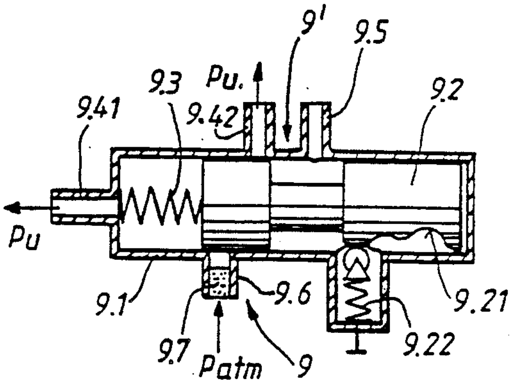
FIG. 2b shows a basic diagram of an intake and non-return valve of the system of FIG. 1.

A limit stop switch and pressure-monitoring switch 6 is provided in the positive pressure line system 4 and a limit stop switch and a negative pressure-monitoring switch 7 is provided in the negative Pressure line system 5. A safetY blow-off valve 8', which also acts as a positive pressure non-return valve 8 (FIG. 2a) is provided between the positive pressure pump 2 and the limit stop switch 6. Analogously, a safety intake valve 9 with negative Pressure non-return valve function 9' (FIG. 2b) is fitted between the negative pressure pump 3 and the limit stop switch 7. A Positive pressure line branch 4.1 with a supply tank 4.2 for pure positive pressure consumers, for example an orthopedic backrest OL, is connected to the positive pressure line system 4 and a negative pressure line branch 5.1 with an expansion tank 5.2 for pure negative pressure consumers, for example an air conditioning system valve control KL, is connected to the negative pressure line system 5, via an electromagnetically switchable 4/2-way directional control valve 10, which is open in the rest position.

Furthermore, branches 4.3, 4.4, 4.5 are provided in the positive pressure line system and, branches 5.3, 5.4, 5.5 in the negative pressure line system.

The branches 4.3/5.3, 4.4/5.4 and 4.5/5.5 lead in pairs to respective inlets of respective magnetically switchable 4/3-way directional control valves 11. These 4/3-way directional control valves 11 connect consumer individual lines 12 to the respective positive pressure or negative pressure branch according to their triggering. In the—central—rest position of the 4/3-way directional control valve 11, on the other hand, the consumer individual lines are connected over the fourth valve way to atmospheric Pressure. Examples of units provided as consumer grouPs connected to the consumer individual lines are central-locking (ZV) and anti-theft (DSA) actuating elements as well as pneumatic door seals (PTD), that are all consumers of positive and negative pressure. The consumer group PTD is preceded in the respective individual line 12 by a pressure limiter 13. With such pressure limiters, the pressure provided in the bidirectional pressure supply system by the pump output can be adapted for individual consumers/consumer groups.

For the electrical triggering of the pressure generator 1, the consumer groups ZV, DSA and PTD are diagrammatically assigned control switches 14, change-over switches with neutral center position. As well as pressure generator triggering, the control switches 14 also provide control pulses for the 4/3-way directional control valves 11 and for the drives, for example compound coils, in order that, along with the starting up of the pressure generator, the respectively assigned 4/3-way directional control valve is also moved into the required switching position, which is predetermined by the respective change-over switch position. With the symbols for diodes in the 4/3-way directional control valves, it is indicated that any triggering from other consumers does not have any effect on the 4/3-way directional control valves 11.

The consumer group ZV is also optionally assigned, in broken lines, further control switches Parallel to the control switches 14:

- a change-over switch 14' for interior oPeration of the central locking,
- an infrared receiver 14" of a remote control, and
- an emergency release switch 14" for release of a centrally locked travelling vehicle in a collision.

Other consumer groups may also be assigned further triggering possibilities in a comparably simple way according to other contemplated embodiments of the invention.

The 4/3-way directional control valves 11 are electrically connected to a control circuit 15 of the pressure generator 1 via two separate sets of lines 16 and 17. These sets of lines make possible a pre-determined period of the respectively governing limit stop switch for the limit-stopping of the pressure generator 1, 6 in the positive pressure range and 7 in the negative pressure range, parallel to the triggering of the pressure generator 1 by the switch 14.

A typical operation of the triggering mechanism is as follows. If a human operator pushes switch 14 in the upward direction a circuit from its positive center tap to the control circuit 15 is completed through the indicated diode and line 16. Control circuit will then actuate the pump motor 20 to drive the pumps 2, 3. At the same time the center top of switch 14 is connected to operate an electric actuator (e.g. solenoid) to shift control valve 11 away from its biased neutral position to connect a control locking consumer ZV to line 4.3 which in turn is connected to the now generated output pressure from pump 2 ( the control 15 having energized the pump 2 motor). While the pressure builds up, a signal is sent from limit stop switch 6 along line 18 via control 15 to hold valve 11 in its upward position and to maintain motor activation for the pump 2. After pressure has reached its desired application, the stop switch signal for holding valve 11 in its upward position is terminated. Thus it can be seen that the limit stop switch 6 acts to insure operation of the control locking consumer 20 even if the human operator releases the switch prematurely. This concept of holding in the motor actuating switch 14 is known from said aforementioned U.S. Pat. No. 3,096,112. A similar type operation is obtained when the switch 14 is moved downwardly by a human operator. Here the circuit is completed through line 17 and vacuum is applied to the central locking consumer. The vacuum limit stop switch 7 operates to hold in the motor and the valve 11 in its lower position similarly as did limit stop switch 6. The parallel switches (change over switch 14' infrared receiver 14") are similar in structure and function to the manually operated switch 14 and are connected in parallel with switch 14. Thus for example, remote locking and unlocking of the car doors could be obtained from an infrared transmitter to move the switch 14'' either to drive the via line 15 or line 17 depending upon whether pressure or vacuum is wanted to open or close the door locks. Emergency release switch 14'' of course only operates on line 16 to open the door lock.

Since a reversal in the direction of rotation of the pressure qenerator drive is not necessary, the electrical triggering can, however, also take place advantageously by means of only a single set of lines 16', shown by a broken line, if the limit stops 6 and 7 are wired in a logical AND operation in such a way that the pressure generator 1 is only shut down after the response of both limit stops 6 and 7. The sets of lines 16 and 17 may then be dispensed with.

For filling of the supply tank 4.2 or evacuation of the expansion tank 5.2, triggering of the pressure generator 1 automatically takes place in a known way, as in the generic prior art, by the limit stops 6 and 7, also designed as pressure-monitoring switches (for positive pressure and negative pressure, respectively). This is so since, when the 4/2-way directional control valve 10 is open in the rest state, the respective tank Pressure acts on the limit stop switches 6 and 7, because the latter are shut off from the pressure generator 1 when the latter is at a standstill, by the non-return valves 8' and 9'.

After automatic triggering of the Pressure generator 1 by one of the limit stops 6 or 7, renewed shut down again takes place by these switches.

Only if the pressure generator 1 is triggered from another point (ZV, DSA, PTD) the 4/2-way direction control valve 10 switches immediately into its locking position. It is immediately switched back into its rest position after the pressure generator has been turned off.

The control circuit 15 is connected via a set of lines 18 shown by a thin solid line, in parallel with the sets of lines 16, and 17 or 16' to the drives of the 4/3-way directional control valves 11. This indicates that the directional control valves 11 are held in the respective switching position after the pulse-like triggering by the change-over control switch 14 with positive potential from the control circuit 15, until the pressure generator 1 is disconnected by the limit stop switch. The same applies to the 4/2-way directional control valve 10. If required, a delayed resetting of the directional control valves 10 and 11 into their respective rest position or center position may be provided.

FIG. *2a* shows, as a detail from FIG. 1, the positive pressure blow-off valve 8 with a non-return valve function 8' in a basic representation.

In a valve housing 8.1, a valve body 8.2 is arranged displaceably against the bias of a spring 8.3. The valve body 8.2 has a stop curve 8.21, into which a sPring-loaded stop tappet 8.22 can drop into two stop locations when the valve body is displaced from its stop position shown. The two stop locations prevent an oscillation of the valve body 8.2 under intermittent pressure admission.

The positive pressure pump 2 is connected to a pressure connection 8.4, a consumer connection 8.5 leads to the limit stop switch 6 and to the 4/2-way directional control valve 10. An air filter 8.7 is fitted into a blow-out nozzle 8.6, a further air filter 8.8 is arranged on a valve-venting opening 8.9 ($p_{atm}$ atmospheric pressure).

Upon positive pressure admission ($p_{uml}$) at the pressure connection 8.4, the valve body 8.2 is displaced to the right and releases the pressure connection 8.5, the stop tappet 8.22 dropping into the first, stronger stop position of the stop curve 8.21. If, due to saturation of the positive pressure consumers, the positive pressure at the connection 8.4 continues to increase even after response of the limit stop switch 6, due to further negative pressure demand of other consumers, the valve body 8.2 is displaced even further to the right and finally, when the stop tappet 8.22 has dropped into the weaker second stop location, releases the blow-off nozzle 8.6.

FIG. *2b* shows, likewise as a detail from FIG. 1, the negative pressure, intake, and non-return valve 9, 9' in basic representation.

A valve housing 9.1 encloses a valve body 9.2 with a stop curve 9.21 for a stop tappet 9.22 and a restoring spring 9.3 has, furthermore, a negative pressure control connection 9.41,
a negative pressure Supply conneCtion 9.42,
a consumer connection 9.5, and
a venting nozzle 9.6 with a fitted air filter 9.7.

Upon operation of the pressure generator 1, negative pressure ($p^u$) is admitted in a like manner to both connections 9.41 and 9.42. The valve body 9.2 is then displaced to the left out of its drawn rest position (negative pressure non-return valve 9' closed) against the force of the restoring spring 9.3 and releases a connection between the negative pressure supply connection 9.42 and the consumer connection 9.5. At the same time, the stop tappet 9.22 drops into the first, stronger stop location of the stop curve 9.21. With even stronger evacuation of the negative pressure line system 5 connected to the negative pressure control connection 9.1, the valve body 9 2 is pulled still further to the left and thereby releases the venting nozzle 9.6. Beforehand, however, the consumer connection 9.5 is already covered again, so that a venting of the limit stop switch and pressure-monitoring switch 7 cannot take place, instead only the negative pressure supply connection 9.42 is vented ($p_{atm}$) via the annular groove of the valve body 9.2. In this valve body position, the stop tappet 9.22 is in the second, weaker stop location of the stop curve 9.21.

On both valves 8 and 9, the biasing force of the stop tappets 8.22 and 9.22 can be set manually according to requirements. As an additional functional safeguard, the limit stop switches 6 and 7 may also be assigned atmosphere connections with flow restrictors, either in separate arrangement or preferably in the way that sintered restrictors are integrated into the valve bodies 8.2, 9.2 of the non-return and safety valves 8', 8 and 9', 9 such that at least a gradual venting, by release or admission of the resPective consumer connection 8.5 or 9.5 can take place via the atmosphere connections 8.6, 9.6, provided in any case. Any "trapped" positive pressure or negative pressure is consequently equalized.

Figure 3:
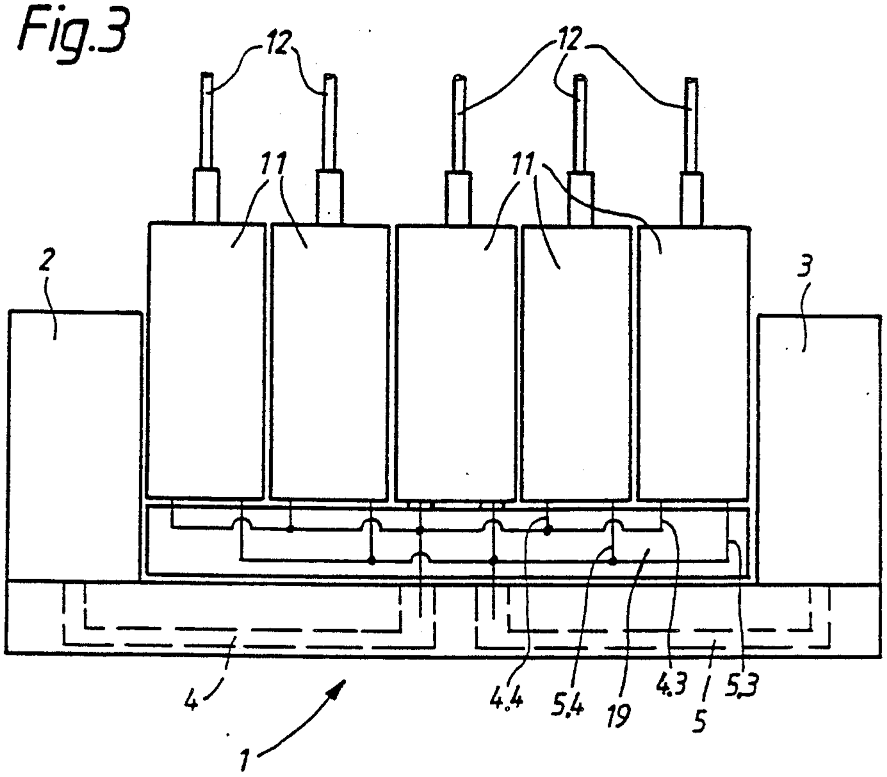
FIG. 3 is diagrammatic view of a pressure generator with a fluid distributor for parallel connected electromagnetic directional control valves, constructed in accordance with the preferred embodiment of the invention depicted in FIGS. 1, 2a and 2b.

Finally, FIG. 3 also shows a diagrammatic representation of the pressure generator 1 with positive pressure pump 2 and negative pressure pump 3 as well as a pneumatic/electrical distributor 19, in which for example five 4/3-way directional control valves 11 are inserted, with simultaneously pneumatic and electric contacting known per se. The consumer individual lines 12 are laid from the centrally arranged distributor 19 to the respective individual consumers, or with further branching, to consumer groups.

If non-return valves, which are opened mechanically by corresponding connection nozzles of the directional control valves 11, are arranged on the pneumatic connections of the distributor 19, the same distributor can be used in an advantageous way also to supply variable numbers of directional control valves, according to the range of equipment of the motor vehicle. A locally remote attachment of directional control valves is, of course, also possible, for example in the case of confined installation space, it also being possible advantageously to use extension lines with pneumatic/electrical plug connectors.

Although the present invention has been described and illustrated in detail, it is to be clearly understood that the same is by way of illustration and example only, and is not to be taken by way of limitation. The spirit and scope of the present invention are to be limited only by the terms of the appended claims.

WHAT IS CLAIMED:

1. Bidirectional pressure supply system for consumers in a motor vehicle which are to be operated with fluid, comprising a pneumatic pressure generator simultaneously admitting negative pressure to a negative pressure line system and positive pressure to a positive pressure line system;

directional control valve for the alternate connection of consumers to one of the completely separate line systems via consumer individual lines;

at least one pressure-dependently responding limit stop switch for the pressure generator;

directional control valves arranged parallel to each other and adapted to be electromagnetically switched independently of each other for selectively switching the respective consumer individual lines individually and in groups between positions connected to the respective negative and positive pressure line systems and position separated from both, and electrical triggering means for initiating operation of the pressure generator and admitting the respective supply of negative and positive pressure to the respective negative and positive pressure line systems; and wherein each of the negative and positive pressure line systems contain a pressure-dependently responding limit stop switch for the pressure generator and a safety valve in the form of a blow-off valve in the positive pressure line system and an intake valve in the negative pressure line system, which safety valves only open after response of the associated limit stop switch in the same line system to protect the pressure generator against overloading when not consuming the respective pressure type ($p_u$ or $p_{uml}$) if the pressure generator is in operation via the limit stop switch assigned to the other line system.

2. Bidirectional supply system according to claim 1, wherein the directional control valves include 4/3-way directional control valves for connecting the consumers (ZV, DSA, PTD) of pneumatic negative pressure ($p_u$) and positive pressure $({}_{uml})$ alternately to the negative pressure line system or the positive pressure line system, wherein in the neutral center position of the 4/3-way directional control valves, the respective consumers are separated from both line systems and vented with atmospheric pressure.

3. Bidirectional supply system according to claim 2, comprising:

a negative pressure line branch which can be connected by a directional control valve with an expansion tank and a negative pressure non-return valve for pure negative pressure consumers;

a positive pressure line branch with supply tank and positive pressure non-return valve for pure positive pressure consumers; and an electromagnetically switchable 4/2-way directional control valve which allows both line branches to be simultaneously connected to the respective negative pressure or positive pressure carrying line system or separated from the latter, wherein the non-return valves are in each case connected between the pressure generator and the 4/2-way directional control valve, and wherein the limit stop switches are fluid connected between the non-return valves and the 4/2-way directional control valve.

4. Bidirectional supply system according to claim 3, wherein a blow-off valve with a positive pressure non-return valve and an intake valve with a negative pressure non-return valve are in each case combined in a structural unit.

5. Bidirectional supply system according to claim 4, comprising a pressure-monitoring switch in the negative pressure line system and in the positive pressure line system, which monitoring switches automatically switch on the pressure generator when there is rising negative pressure or falling positive pressure, respectively, wherein the 4/2-way directional control valve is automatically reset to an open position connecting the two line branches to the respective line system after limit-stopping of the pressure generator, and wherein the limit stop switches are also designed as pressure-monitoring switches for the expansion tank in the negative pressure line branch and for the supply tank in the positive pressure line branch, respectively.

6. Bidirectional supply system according to claim 5, with a priority protection at least for the operation of consumers in the form of door locking actuating elements, wherein the 4/2-way directional control valve is switched over into its close position upon each pressure request by consumers of negative pressure and positive pressure or by corresponding electrical triggering of the pressure generator respectively.

7. Bidirectional pressure supply system according to claim 5, wherein the limit stop switches/pressure-monitoring switches are in each case fluid-assigned and an atmosphere connection provided with a flow restrictor for gradual venting by admission or release with a closed 4/2-way directional control valve.

8. Bidirectional pressure supply system according to claim 7, wherein the flow restrictors are integrated into the respective non-return valve.

9. Bidirectional pressure supply system according to claim 1, wherein certain consumers (PTD) of negative pressure and positive pressure are preceded by a pressure-limiting valve in a consumer individual line.

10. Bidirectional pressure supply system according to claim 8, wherein certain consumers (PTD) of negative pressure and positive pressure are preceded by a pressure-limiting valve in a consumer individual line.

11. Bidirectional pressure supply system according to claim 4, wherein the blow-off valve and the intake valve each have at least one, preferably two, stop locations.

12. Bidirectional pressure supply system according to claim 1, wherein a fluid distributor is provided with negative pressure and positive pressure connections as well as plug holders for plug-in 4/3-way directional control valves forming at least part of said directional control valves.

13. Bidirectional pressure supply system according to claim 1, wherein the pressure generator has an electric motor and two pumps, which can be driven by the latter, one pump for negative pressure generation and one pump for positive pressure generation.

14. Bidirectional pressure supply system according to claim 13, wherein the electric motor, the pumps, the non-return/safety valves, the limit stop switches/pressure-monitoring switches, the 4/2-way directional control valve, and an electrical control unit as well as, when required, the fluid distributor are combined in a close structural unity in a common housing.

15. Bidirectional pressure supply system according to claim 13, wherein all atmosphere connections of valves are provided with air filters.

16. Bidirectional pressure supply system according to claim 1, wherein upon each electrical triggering of the pressure generator by an electric switch, an electric signal is generated for determination of the governing switch of the two limit stop switches for the limit-stopping of the pressure generator.

17. Bidirectional pressure supply system according to claim 1, wherein the two limit stop switches are connected by a logical AND operation, so that the limit stopping of the pressure generator only takes place if both limit switches respond.

18. Bidirectional pressure supply system according to claim 8, wherein upon each electrical triggering of the pressure generator by an electric switch, an electric signal is generated for determination of the governing switch of the two limit stop switches for the limit-stopping of the pressure generator.

19. Bidirectional pressure supply system according to claim 8, wherein the two limit stop switches are connected by a logical AND operation, so that the limit stopping of the pressure generator only takes place if both limit switches respond.

20. Bidirectional pressure supply system according to claim 1, wherein said pneumatic pressure generator includes a non-reversible motor driving respective separate positive and negative pressure generating pumps.

* * * * *